United States Patent
Pacher et al.

(10) Patent No.: US 7,210,388 B2
(45) Date of Patent: May 1, 2007

(54) BIMETAL SAW BAND

(75) Inventors: Oskar Pacher, Graz (AT); Werner Lenoir, Unna (DE)

(73) Assignee: Stahlwerk Ergste Westig GmbH, Schwerte (DE)

( * ) Notice: Subject to any disclaimer, the term of this patent is extended or adjusted under 35 U.S.C. 154(b) by 31 days.

(21) Appl. No.: 10/349,602

(22) Filed: Jan. 23, 2003

(65) Prior Publication Data

US 2003/0154841 A1 Aug. 21, 2003

(30) Foreign Application Priority Data

Jan. 25, 2002 (DE) ............................... 102 02 770

(51) Int. Cl.
*B23D 61/12* (2006.01)
*B26D 1/18* (2006.01)

(52) U.S. Cl. ........................... 83/835; 83/846; 83/853; 83/855; 83/661; 428/683; 428/686; 76/104.1; 76/112; 420/111; 420/122; 420/89; 30/345; 30/349; 30/355

(58) Field of Classification Search ................. 83/835, 83/661, 834, 829, 663, 839, 54, 55, 846, 83/676, 855, 853, 698.41, 875, 851, 850; 30/349, 357, 166.3, 340, 345, 355, 309, 388; 29/196.1; 419/18, 38; 75/124, 240, 246, 75/25.1, 48; 407/119; 76/112, 104.1, 101.1; 420/122, 89, 11, 67, 105, 114, 108, 111, 107, 420/109; 428/681–686, 932

See application file for complete search history.

(56) References Cited

U.S. PATENT DOCUMENTS 2,252,869 A * 8/1941 Shortell et al. ............... 420/99
2,306,187 A * 12/1942 Ronan .......................... 83/835
2,637,671 A * 5/1953 Pavitt ........................... 419/25
3,211,593 A * 10/1965 August ....................... 148/621
3,766,808 A * 10/1973 Cremisio et al. ............. 76/112
4,058,650 A * 11/1977 Kiyonaga et al. ........... 428/683
4,116,684 A * 9/1978 Uchida et al. .............. 420/101

(Continued)

FOREIGN PATENT DOCUMENTS

EP 0 569 346 A1 11/1993

(Continued)

*Primary Examiner*—Boyer D. Ashley
*Assistant Examiner*—Ghassem Alie
(74) *Attorney, Agent, or Firm*—Cook, Alex, McFarron, Manzo, Cummings & Mehler Ltd.

(57) ABSTRACT

A bimetal saw band which is suitable for cutting materials of high hardness and wear resistance at high cutting speeds and with a reduced consumption of coolant is disclosed. The saw band includes a support band with from 0.20 to 0.45% of carbon, from 0.2 to 0.6% of silicon, from 0.5 to 1.8% of manganese, from 0.1 to 3.5% of molybdenum, from 1.0 to 5.0% of chromium, from 0.5 to 1.5% of nickel, from 0.1 to 1.0% of copper, from 0.1 to 2.0% of tungsten, from 0.1 to 0.5% of vanadium, from 0.01 to 0.30% of niobium and/or tantalum and less than 0.2% of cobalt, and the remainder iron including melting-related impurities, with the tungsten, vanadium and niobium/tantalum contents matched to one another. The saw includes hardmetal tips including at least 75% of tungsten carbide and 5 to 15% of cobalt, as well as grain stabilizers with a grain size of less than 5 μm.

2 Claims, 3 Drawing Sheets

U.S. PATENT DOCUMENTS

| | | | |
|---|---|---|---|
| 4,140,524 A | * | 2/1979 | Oberholtzer et al. ............ 420/99 |
| 4,232,096 A | * | 11/1980 | Franzen et al. .............. 428/683 |
| 4,462,293 A | * | 7/1984 | Gunzner ...................... 83/855 |
| 4,497,660 A | * | 2/1985 | Lindholm ..................... 75/240 |
| 4,784,033 A | * | 11/1988 | Hayden et al. ................ 83/661 |
| 4,889,025 A | * | 12/1989 | Collett ....................... 83/835 |
| 5,015,539 A | * | 5/1991 | Daxelmueller et al. ...... 428/685 |
| 5,032,356 A | * | 7/1991 | Kumagai et al. ............ 420/111 |
| 5,091,264 A | * | 2/1992 | Daxelmueller et al. ...... 428/685 |
| 5,417,777 A | * | 5/1995 | Henderer .................... 148/334 |
| 5,651,842 A | * | 7/1997 | Nakamura et al. ........... 148/321 |
| 5,697,994 A | * | 12/1997 | Packer et al. ................. 51/309 |
| 6,096,436 A | * | 8/2000 | Inspektor .................... 428/469 |
| 6,228,139 B1 | * | 5/2001 | Oskarsson ..................... 75/240 |
| 6,241,799 B1 | * | 6/2001 | Galli ........................... 75/236 |
| 6,272,963 B1 | * | 8/2001 | Fukumoto .................... 83/788 |
| 6,363,827 B1 | * | 4/2002 | Osing et al. .................. 83/835 |
| 6,375,762 B1 | * | 4/2002 | Deimel ........................ 148/319 |
| 6,491,769 B1 | * | 12/2002 | Smith et al. ................. 148/428 |
| 2002/0185197 A1 | * | 12/2002 | Farr et al. ................... 148/428 |
| 2004/0052593 A1 | * | 3/2004 | Anderson ................... 407/119 |

FOREIGN PATENT DOCUMENTS

EP  0 580 349 B1  1/1994

* cited by examiner

BIMETAL SAW BAND

This application claims priority from German Patent Application 102 02 770.6-14, filed Jan. 25, 2002.

The invention relates to a bimetal saw band, in which at least the tooth tips consist of a hard metal and the support band consists of a relatively tough steel.

Saw bands, which are primarily to be understood as encompassing saw blades, have to have a high dimensional stability at their cutting edges and a high wear resistance and also have to be able to cope with the high loads resulting from compressive, bending and shear forces even at the not inconsiderable temperatures which result from the friction between saw band and material being cut. This applies in particular to saw bands which run at high speed and are subject to considerable bending where they are diverted.

Since it is difficult to combine the required properties in a single material, bimetal saw bands nowadays usually comprise a relatively tough support band with a high bending fatigue strength and a cutting part, which is likewise in band form, made from a high-speed or cold-work steel of low toughness but high wear resistance. The width of the cutting band is such that at least the tooth tips of the saw band or blade or also the cutting teeth as a whole can be machined out of it.

It is known to connect the support band and the cutting band to one another by laser or electron-beam welding without the use of a filler.

In practice, it has been found that the welding heat often causes distortion to the teeth or tooth tips, and consequently they no longer adopt the intended angular position with respect to the saw band or saw blade plane, and consequently are subject to considerably greater levels of wear. It has been possible to determine local concentration differences in the region of the weld seam as being the cause of this phenomenon. Concentration differences of this type, and in particular the concentration gradient transversely with respect to the weld seam, which inevitably results when two materials of different compositions are welded together, often lead to residual stresses and therefore have an adverse effect on the service life.

EP 0 569 346 A1 has also already disclosed a bimetal saw band or blade comprising a steel support band comprising 0.20 to 0.40% of carbon, 2.5 to 5.0% of chromium, 2.0 to 3.0% of molybdenum, 0.03 to 0.04% of vanadium and, as grain-refining agent, in total less than 0.01% of niobium and titanium, firstly, and a cutting band made from a high-speed steel comprising 0.65 to 1.8% of carbon, 3.0 to 6.0% of chromium, 4.0 to 12.0% of molybdenum and 0.5 to 5.0% of vanadium. A particular characterizing feature of this saw band is the simultaneous presence of chromium, vanadium and molybdenum in both materials and the fact that the total niobium and titanium content in the support band is limited to at most 0.01% with a view to achieving a sufficient fatigue strength. To improve the weldability, both materials also contain aluminum, specifically in an amount of up to 2.0% in the cutting part and up to 0.15% in the support band.

It is also known to use sintered hard metal as material for the tooth tips of a saw band. Hard metals of this type essentially comprise tungsten carbide in an embedding compound comprising 4 to 15% cobalt as bonding metal, if appropriate with small amounts of titanium and tantalum carbide. However, the use of carbide tips is associated with the risk of an increased brittleness and susceptibility to fracturing in the region of the fused joint between the carbide tooth tips and the steel support band. To counteract this and to ensure a higher toughness or improved resistance to pressure and impact, it is recommended to use hard metals which have a higher hardness and toughness on account of a fine-grained microstructure. However, the fine-grained microstructure is lost, since spontaneous grain growth takes place as a result of recrystallization during the fusion joining of the cutting teeth to the support band under the influence of the welding heat or in operation under the influence of the frictional heat which occurs during high-speed sawing. The smaller the grain size, the greater the grain growth. Islands with large tungsten carbide crystals are formed in the microstructure, and these islands promote the formation of fractures under mechanical and/or dynamic load, i.e. at high cutting pressures and cutting speeds or vibrations. Moreover, this grain growth is associated with the formation of brittle phases and internal stresses in the melting zone on both sides of the carbide/support band interface.

To suppress the grain growth, which is already taking place during sintering, it is known to add chromium, vanadium and niobium or tantalum carbides to the powder mixture as growth inhibitors. However, their action is at least partially lost during fusion joining through the fact that the introduction of heat leads to diffusion between the cutting-tip material and the support-band material.

This is where the invention intervenes, being directed at a saw band or blade with a cutting part or cutting tips made from a fine-grained tungsten carbide hard metal, the fine-grained nature of which is retained even under the influence of the introduction of heat during fusion joining or at the high temperatures of high-speed sawing and/or requires less cooling lubricant on account of the reduced risk of coarse grains being formed. The hard metal comprises at least 75% of tungsten carbide and 5 to 15% of cobalt, as well as, if appropriate, grain stabilizers.

According to the invention, the composition of the support-band steel is such that tungsten carbide from the joint zone is less soluble in the support band. This effect is achieved in particular by means of tungsten and copper, while at the same time the carbon content of the support band counteracts grain growth of the tungsten carbide in the cutting-tip material. By contrast, cobalt in the support-band steel increases the solubility of the tungsten carbide. Therefore, the support-band steel preferably does not contain any cobalt or at most contains less than 0.2% of cobalt.

Grain growth in the microstructure in the joining zone or heat-affected zone of the fine-grained hard metal and the associated embrittlement can be avoided, according to the invention, if the support band consists of a steel with the minimum possible solubility for tungsten carbide. This is the case if the support-band steel contains tungsten, copper and carbon individually or in combination within the following content limits: from 0.1 to 2.0% of tungsten, from 0.1 to 1.0% of copper, from 0.2 to 0.45% of carbon and preferably less than 0.2% of cobalt.

If the hard metal of the cutting tips contains grain stabilizers, for example 0.5 to 5% of at least one of the carbides $Cr_3C_2$, VC and NbC and up to 3% of titanium carbide and/or tantalum carbide, it is advantageous to counteract the solubility of these grain stabilizers in the support band by the support band containing the corresponding carbide-forming agents, for example, chromium, vanadium and niobium/tantalum, in amounts of from 1.0 to 5.0% of chromium, 0.1 to 0.5% of vanadium and 0.01 to 0.30% of niobium and/or tantalum. From 1.8 to 4.0% of chromium, from 0.1 to 0.5% of vanadium and from 0.01 to 0.30% of niobium and/or tantalum or also from 1.5 to 2.5% of chromium are particularly favorable.

To ensure a synergistic action with regard to the weldability and the suppression of grain growth, the tungsten, vanadium, niobium/tantalum contents in the support-band steel preferably satisfy the following condition:

$SE = 1.5 \times (\% W) + 4(\% V + \% Nb + \% Ta) => 1.5$.

This applies in particular with a support band comprising:

| | |
|---|---|
| 0.20 to 0.45% | of carbon |
| 0.2 to 0.6% | of silicon |
| 0.5 to 1.8% | of manganese |
| 0.1 to 3.5% | of molybdenum |
| 1.0 to 5.0% | of chromium |
| 0.5 to 15% | of nickel |
| 0.1 to 0.5% | of copper |
| 0.1 to 2.0% | of tungsten |
| 0.1 to 0.5% | of vanadium |
| 0.01 to 0.30% | of niobium/tantalum |
| less than 0.2% | of cobalt | remainder iron including melting-related impurities, in particular for a hard metal cobalt content of from 8 to 12%, a grain stabilizer content of from 0.5 to 5% and a grain size of less than 0.8 μm.

The support band may also consist of:

| | |
|---|---|
| 0.25 to 0.40% | of carbon |
| 0.2 to 0.50% | of silicon |
| 0.5 to 1.5% | of manganese |
| 1.0 to 3.5% | of molybdenum |
| 1.8 to 4.5% | of chromium |
| 0.5 to 1.5% | of nickel |
| 0.1 to 0.5% | of copper |
| 0.5 to 2.0% | of tungsten |
| 0.1 to 0.5% | of vanadium |
| 0.01 to 0.30% | of niobium/tantalum |
| less than 0.2% | of cobalt | remainder iron including melting-related impurities.

A support band of this type is suitable in particular for a hard metal with a cobalt content of from 8 to 12% and a tungsten carbide grain size of less than 0.8 μm.

However, the support-band steel may also contain:

| | |
|---|---|
| 0.25 to 0.32% | of carbon |
| 0.30 to 0.45% | of silicon |
| 0.8 to 1.5% | of manganese |
| 1.0 to 2.5% | of molybdenum |
| 1.5 to 2.5% | of chromium |
| 0.5 to 1.5% | of nickel |
| 0.1 to 0.5% | of copper |
| 1.2 to 1.8% | of tungsten |
| 0.1 to 0.5% | of vanadium |
| 0.01 to 0.30% | of niobium/tantalum |
| less than 0.2% | of cobalt | remainder iron including melting-related impurities, preferably for a cobalt content of from 8 to 12% in the hard metal and a tungsten carbide grain size of less than 0.4 μm.

By way of example, the saw band according to the invention can be produced by providing a steel strip with the contours of a support band by metal-removing machining and then subjecting this strip to an austenitizing anneal under tensile stress at a temperature of from 1050 to 1220° C. The strip is then quenched from the austenitizing temperature at a cooling rate of 300° C./min and is then brought to a hardness of over HRC 48 by subsequent tempering at 500 to 650° C. for 40 minutes. The support band which has been prepared in this way is then provided with cylindrical hard-metal bodies by fusion welding, and these hard-metal bodies are finally converted into the desired cutting tip shape by grinding.

The finished saw band or blade can finally be tempered again for a short time, for example 15 min at 560° C.

The invention is explained in more detail below with reference to exemplary embodiments and drawings, in which.

Submicron WC Powder and a fine-grained WC powder, each containing 8% of cobalt, as powder granules, i.e. as free-flowing powders which can be pressed directly, were used to produce hard-metal bodies. The powders already contained additions of grain stabilizers (H1 and H3, Table II) and were able to be pressed directly in a hydraulic press under a pressure of 320 MPa to form cylinders with a diameter of approx. 3 mm. The parts were then introduced into a vacuum sintering furnace and sintered at 1350° C. After sintering, the microstructure of specimens H1 and H2 was studied under an electron microscope, and a mean WC grain size of from 0.4 and 0.8 μm, respectively, was determined. Under an optical microscope, the specimen H3 revealed a WC grain size of 2.5 μm.

The hard-metal cylinders produced in this way were able to be used directly for the production of saw blades by means of fusion welding.

In the case of hard metals with a low cobalt content, a certain residual porosity may still remain after the sintering. This can be eliminated by means of further isostatic compression, for example in a pressure-sintering furnace at 20 bar under an argon atmosphere.

Figure 1:
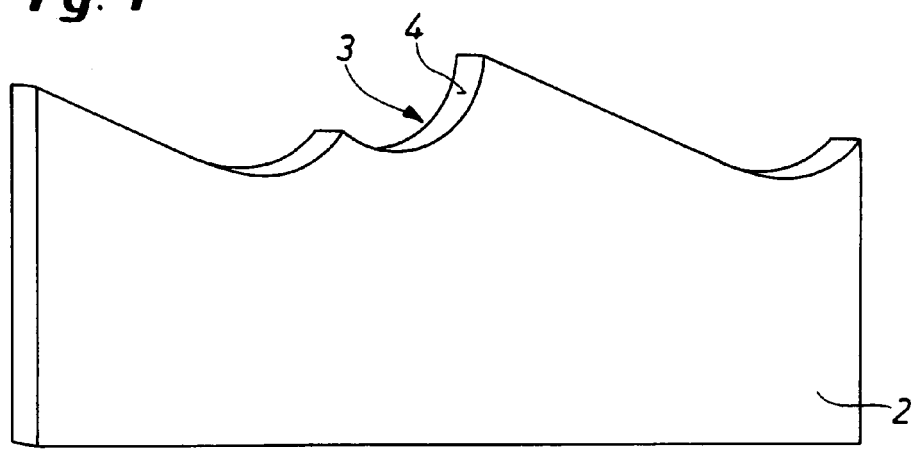
FIG. 1 shows a contoured support band.
Figure 2:
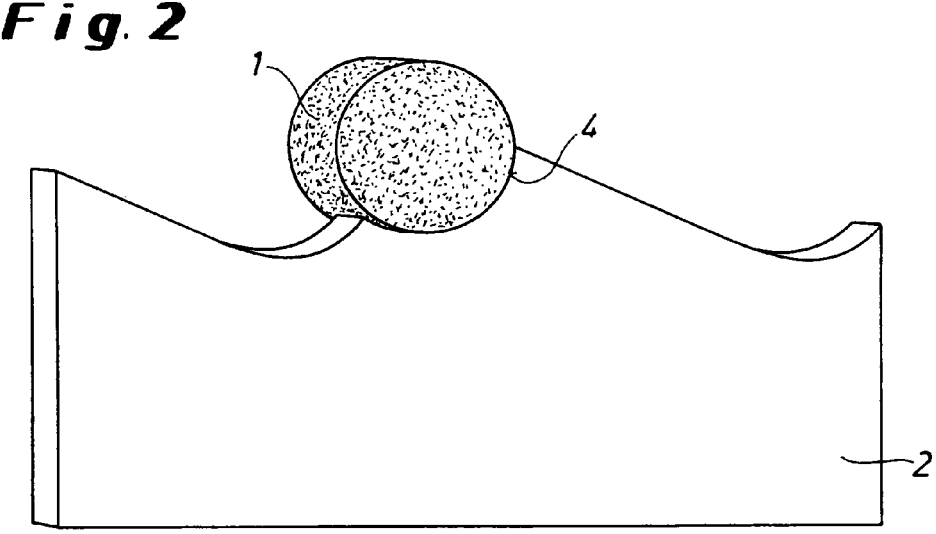
FIG. 2 shows the support band shown in FIG. 1 with a hard-metal body inserted.
Figure 3:
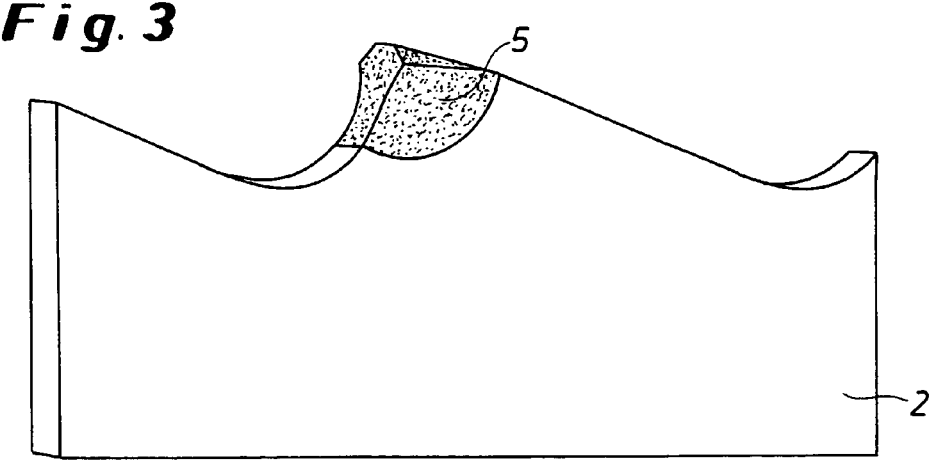
FIG. 3 shows a finished saw band.

Support bands made from steels TB1 and TB2 in accordance with the invention and comparison steels TB3 and TB4 which are not covered by the invention (Table I) and the hard metals H1 to H3 with different WC grain sizes (Table II) were processed into saw band blanks by fusion contact. In this case, cylindrical hard-metal bodies 1 with a diameter and width of 3 mm, with a copper electrode, were pressed onto a support band 2, which is illustrated in FIG. 1 and has recesses 3, and a high current was applied to the contact surface 4 for a few milliseconds. The result was a fusion joint between the bonding metal (cobalt) of the hard metal and the support-band steel. A band blank as illustrated in FIG. 2 was formed. Alternatively, inductive heating may also be used. The joining or connecting zone was then cooled rapidly in air and was briefly tempered at 450 to 550° C. Test saw bands S1 to S7 (Table III) with tooth tips 5 corresponding to the illustration shown in FIG. 3 were produced from the saw band blanks (FIG. 2) by grinding using diamond grinding wheels. These saw bands were used to determine the cutting capacity SL with the aid of a soft-annealed, carbide-rich PM steel, of the steel grade material All in accordance with AISI standard (trade name CPM 10 V). The surface area cut was in each case 110 cm2 and the cutting speed was 85 m/min. To determine the cutting capacity SL, the time required for the corresponding cut surface area was determined and calculated according to the formula: SL=surface area/time.

To test the ability of the saw bands to withstand demanding thermal conditions, the tests were carried out using only 10% of the normal quantity of coolant under otherwise identical conditions (reduced lubricant cooling).

Tests 1 to 4 and 8 to 11 were carried out using saw bands according to the invention, while tests 5 to 7 and 12 to 14 were carried out using comparison bands.

Figure 4:
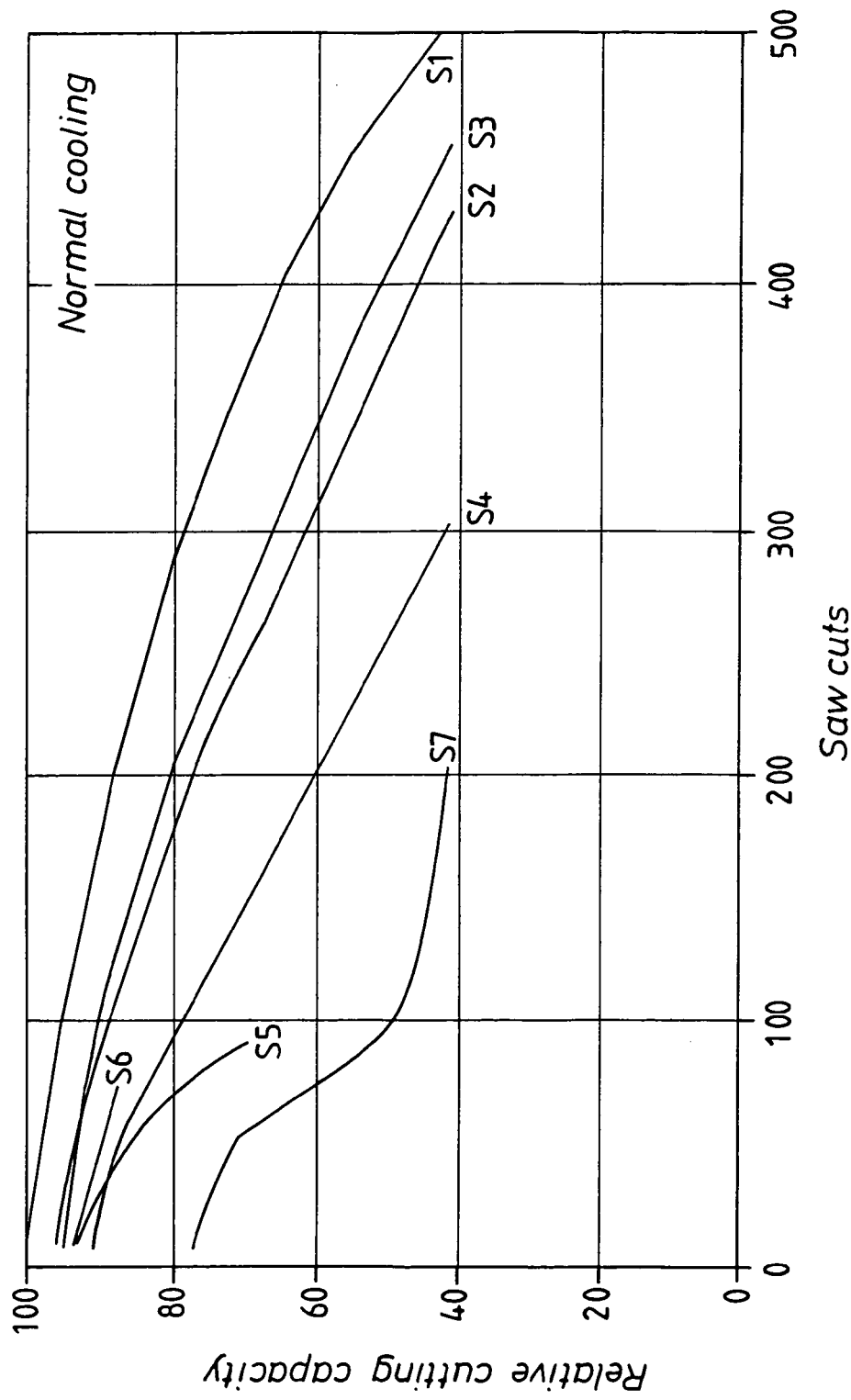
FIG. 4 shows a graph illustrating the cutting capacity as a function of the number of saw cuts with normal cooling.
Figure 5:
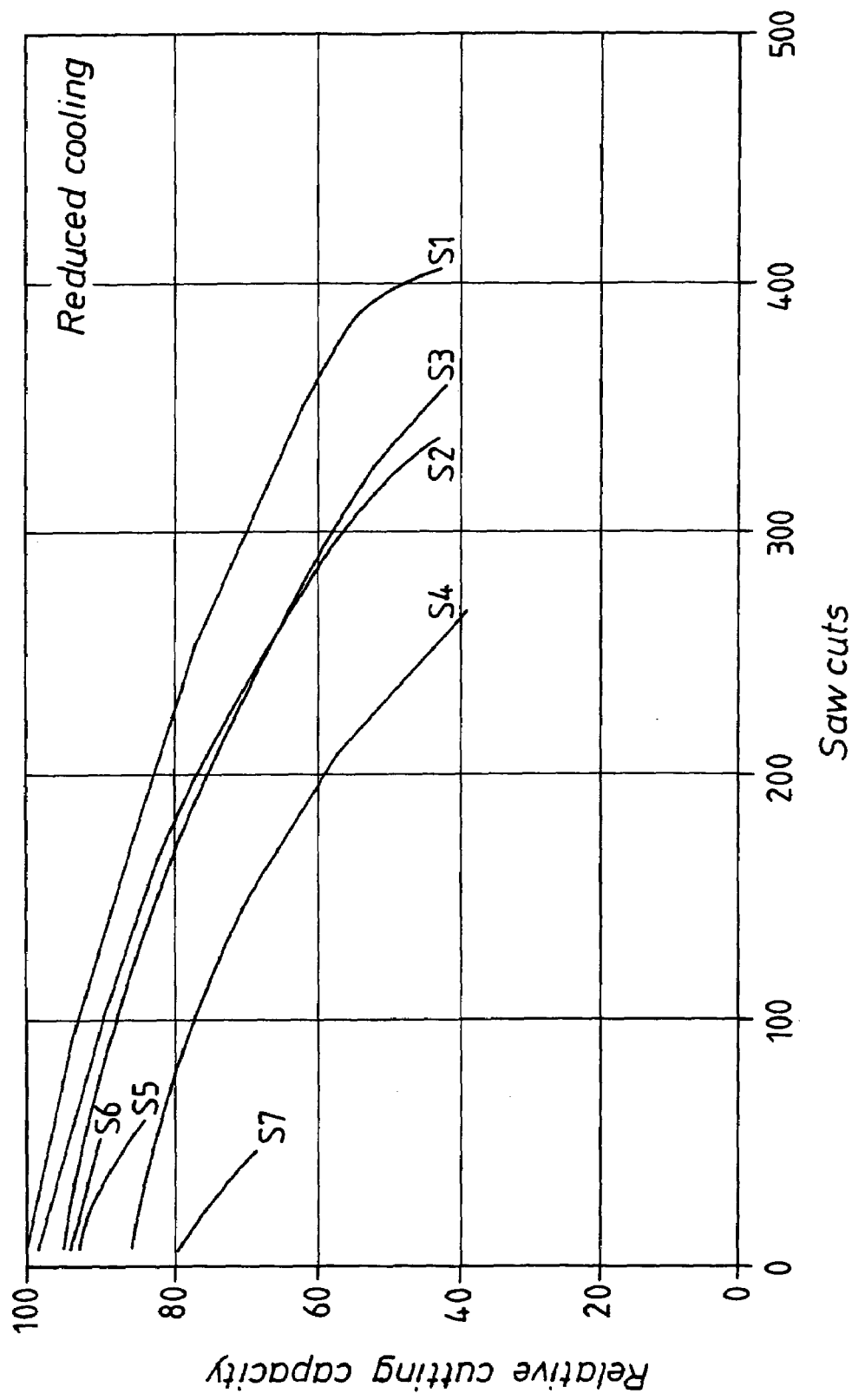
FIG. 5 shows a diagram similar to that shown in FIG. 4 for the tests carried out with reduced cooling.

The cutting capacities of tests 1 to 7 with normal lubricant cooling are shown in the diagram presented in FIG. 4, and the cutting capacities of tests 1 to 7 with a reduced supply of coolant are shown in the diagram presented in FIG. 5. Table III gives the values for the relative cutting capacity of the saw bands after 100 cuts and the number of cuts achieved for the test bands.

In tests 1 to 7 and 8 to 14, the initial cutting capacity of the saw band S1 was in each case assumed to be 100%. Since the cutting capacity (cut area/min) decreases with the number of saw cuts on account of wear, all the tests were terminated when a relative cutting capacity of 40% was reached. The tests using saw bands S5 to S7 had to be interrupted prematurely on account of tooth fracture.

The superiority of the saw bands according to the invention, in particular with the fine-grained hard metals H1 and H2, is attributable to the advantageous composition of the support band. The results with a reduced cooling lubrication (FIG. 5) are an indication of the improved ability to withstand high temperatures in combination with a high wear resistance and a high cutting capacity on the part of the saw bands according to the invention.

The high cutting capacities and service lives of the saw bands S1 to S4 according to the invention are based on a synergistic interaction between the properties of the support band and the properties of the support band and the properties of the fusion joint zone (heat-affected zone) and of the fine-grained hard metal. The fact that the saw bands S1 to S4 according to the invention produce very high cutting capacities compared to saw bands S5 to S7, which are not covered by the invention, both with normal cooling (FIG. 4) and with reduced cooling (FIG. 5), demonstrates the very good ability of the saw bands to withstand mechanical and thermal loads.

The saw bands according to the invention do not experience any tooth or band fracture even under demanding conditions and generally achieve high cutting capacities. By contrast, the results of saw bands S5 to S7 with the support bands TB3 and TB4 which are not covered by the invention are extremely poor.

The trend in machining is toward reducing the coolant consumption as far as possible. In particular, oil emulsions contain toxic additives (bactericides, fungicides) and cause high maintenance, disposal and operating costs. However, since cooling is often impossible to dispense with altogether, the quantity of coolant required should be minimized in order to keep the outlay on maintenance (monitoring of the stability of the emulsion, chemical analyses, consumption of stabilizers, mixing and aeration, etc.) at a low level.

However, it is only possible to work with small quantities of lubricant if the ability of the saw bands to withstand high temperatures allows this. Therefore, in band saws the support band should have the maximum possible ability to withstand high temperatures.

TABLE I

| All. | C (%) | Si (%) | Mn (%) | Mo (%) | Cr (%) | Ni (%) | W (%) | V (%) | Nb (%) | Cu (%) | SE* (%) |
|---|---|---|---|---|---|---|---|---|---|---|---|
| TB1 | 0.32 | 0.30 | 1.05 | 1.10 | 4.0 | 0.75 | 0.10 | 0.32 | 0.10 | 0.20 | 1.83 |
| TB2 | 0.30 | 0.38 | 1.08 | 1.50 | 2.0 | 0.95 | 1.50 | 0.28 | 0.10 | 0.15 | 3.77 |
| TB3 | 0.34 | 0.35 | 0.95 | 0.95 | 2.8 | 0.70 | 0.10 | 0.22 | 0.02 | 0.02 | 1.15 |
| TB4 | 0.29 | 0.20 | 0.40 | 2.40 | 3.8 | 0.45 | 0.05 | 0.21 | 0.01 | 0.04 | 1.00 |

*SE = Rare earth metals

TABLE II

| Hard metal | Mean WC grain size ($\mu m$) | Co (%) | Grain stabilizers (%) | Hardness HV30 | Fatigue bending strength (N/mm$^2$) |
|---|---|---|---|---|---|
| H1 | 0.4 | 8 | $Cr_3C_2$, VC, NbC | 3.0 | 1900 | 3510 |
| H2 | 0.8 | 8 | $Cr_3C_2$, VC | 1.5 | 1500 | 2600 |
| H3 | 2.5 | 8 | TiC, TaC | 0.5 | 1400 | 2000 |

TABLE III

| Test No. | Saw band | Combination | Coolant quantity (%) | Number of cuts | Rel. cutting capacity after 100 cuts |
|---|---|---|---|---|---|
| 1 | S2 | TB2/H1 | 100 | 506 | 96 |
| 2 | S1 | TB1/H1 | 100 | 323 | 90 |
| 3 | S3 | TB2/H2 | 100 | 463 | 91 |
| 4 | S4 | TB2/H3 | 100 | 305 | 79 |
| 5 | S5 | TB3/H1 | 100 | 94 | tooth fracture |
| 6 | S6 | TB4/H1 | 100 | 76 | tooth fracture |
| 7 | S7 | TB4/H2 | 100 | 202 | 50 |
| 8 | S2 | TB2/H1 | 10 | 410 | 94 |
| 9 | S1 | TB1/H1 | 10 | 342 | 90 |
| 10 | S3 | TB2/H2 | 10 | 361 | 88 |
| 11 | S4 | TB2/H3 | 10 | 265 | 77 |
| 12 | S5 | TB3/H1 | 10 | 63 | band fracture |
| 13 | S6 | TB4/H1 | 10 | 51 | tooth fracture |
| 14 | S7 | TB4/H2 | 10 | 40 | tooth fracture |

What is claimed:

1. A bimetal saw band, comprising (a) a support band made from steel consisting essentially of at least one of the following:
   from 1.8 to 4.0% of chromium,
   from 0.1 to 0.5% of vanadium or
   from 0.01 to 0.30% of niobium and/or tantalum,
   said steel further comprising,
   from 0.1 to less than 2.0% of tungsten and/or
   from 0.1 to 1.0% of copper and
   less than 0.2% cobalt, and
   (b) hard-metal tips comprising at least 75% of tungsten carbide and 5 to 15% of cobalt and 0.5 to 5% of at least one of the carbides $Cr_3C_2$, VC and NbC and up to 3% of titanium carbide and/or tantalum carbide as grain stabilizers with a grain size of less than 5 $\mu m$.

2. The saw band as claimed in claim 1, in which the support band comprises 0.2 to 0.45% of carbon.

* * * * *